US009225676B1

(12) United States Patent
Shoham et al.

(10) Patent No.: US 9,225,676 B1
(45) Date of Patent: Dec. 29, 2015

(54) SOCIAL NETWORK EXPLORATION SYSTEMS AND METHODS

(75) Inventors: Yoav Shoham, Los Altos Hills, CA (US); Thuc D. Vu, Palo Alto, CA (US); Chris Grier, Berkeley, CA (US)

(73) Assignee: Google Inc., Mountain View, CA (US)

( * ) Notice: Subject to any disclaimer, the term of this patent is extended or adjusted under 35 U.S.C. 154(b) by 699 days.

(21) Appl. No.: 13/436,687

(22) Filed: Mar. 30, 2012

Related U.S. Application Data

(60) Provisional application No. 61/469,287, filed on Mar. 30, 2011.

(51) Int. Cl.
*G06F 15/16* (2006.01)
*H04L 12/58* (2006.01)
*H04L 29/08* (2006.01)

(52) U.S. Cl.
CPC ............... *H04L 51/32* (2013.01); *H04L 12/588* (2013.01); *H04L 67/14* (2013.01); *H04L 67/306* (2013.01)

(58) Field of Classification Search
CPC ....... H04L 51/32; H04L 67/306; H04L 67/14; H04L 12/588
USPC .......................................................... 709/204
See application file for complete search history.

(56) References Cited

U.S. PATENT DOCUMENTS

| | | | | |
|---|---|---|---|---|
| 8,316,020 | B1 * | 11/2012 | Kleinmann ................ | 707/734 |
| 2010/0146118 | A1 * | 6/2010 | Wie ............................ | 709/225 |
| 2011/0112976 | A1 * | 5/2011 | Ryan et al. ................. | 705/319 |
| 2011/0113098 | A1 * | 5/2011 | Walsh et al. ............... | 709/204 |

OTHER PUBLICATIONS

Lada A. Adamic et al., "Social network caught in the Web," First Monday, vol. 8, No. 6, Jun. 2, 2003, 22 pages.
Thomas Erickson et al., "Social Translucence: Using Minimalist Visualizations of Social Activity to Support Collective Interaction," Designing Information Spaces: The Social Navigation Approach (eds. K. Höök, D. Benyon, A Munroe), Springer-Verlag: London, 2003, pp. 17-41.
thebubba, "FAQ Question #163: How do I find a syndicated account?," LiveJournal, Jan. 6, 2004, 2 pages.
Marco Neumann et al., "Semantic Social Network Portal for Collaborative Online Communities," Journal of European Industrial Training, vol. 29, No. 6, Jan. 2005, pp. 472-487.
(Continued)

*Primary Examiner* — Vivek Srivastava
*Assistant Examiner* — Karina J Garcia-Ching
(74) *Attorney, Agent, or Firm* — Fish & Richardson P.C.

(57) ABSTRACT

Systems, methods and computer-readable media for accessing exploration configuration data usable to configure an exploration of at least a portion of a social network of a user, the social network representing relationships among entities associated with the user by social network services, the exploration configuration data including a profile parameter descriptive of at least some of the plurality of entities, and including a path parameter specifying the portion of the social network, performing the exploration of at least the portion of the social network, the exploration being configured by the path parameter and including retrieval of profile data that is descriptive of at least some of the plurality of entities, the retrieval being based on the profile parameter, and identifying one or more entities among the plurality of entities as being described by the profile parameter, the identifying being based on the exploration as configured by the exploration configuration data.

20 Claims, 8 Drawing Sheets

(56) References Cited

OTHER PUBLICATIONS

Ina O'Murchu et al., "Online Social and Business Networking Communities," DERI Technical Report Aug. 11, 2004 DERI—Digital Enterprise Research Institute, Aug. 2004, 22 pages.

Ronald van Eijk et al., "We-centric, context-aware, adaptive mobile service bundles," Telematica Instituut, Freeband Frux D1.1, Nov. 30, 2004, 48 pages.

Marc Steen et al., "Development of we-centric, context-aware, adaptive mobile services requires empathy and dialogue," Freeband Frux, 2005, 4 pages.

Junichiro Mori et al., "Real-world Oriented Information Sharing Using Social Networks," Proceedings of the 2005 International ACM SIGGROUP Conference on Supporting Group Work (GROUP 05), Nov. 6-9, 2005, pp. 81-84.

Tracy Cohen et al., "Social Networks for Creative Collaboration," Proceedings of the 5th Conference on Creativity & Cognition (C&C'05), Apr. 12-15, 2005, London United Kingdom, pp. 252-255.

Jeffrey Heer et al., "Vizster: Visualizing Online Social Networks," IEEE Symposium on Information Visualization (INFOVIS 2005), Oct. 23-25, 2005, pp. 32-39.

\* cited by examiner

SOCIAL NETWORK EXPLORATION SYSTEMS AND METHODS

CROSS-REFERENCE TO RELATED APPLICATIONS

This application claims the benefit of U.S. Prov. App. No. 61/469,287, filed Mar. 30, 2011, the disclosures of which is expressly incorporated herein by reference in the entirety.

BACKGROUND

The subject matter disclosed herein generally relates to the processing of data. Specifically, the present disclosure addresses systems and methods to facilitate exploring a social network with a social network exploration machine.

A social network may represent social relationships between a user of one or more social network services and one or more entities that use one or more of the social network services. A user or an entity may be a person (e.g., a human), a group of people (e.g., a family organization), a persona (e.g., a celebrity or fictitious character), a business (e.g., a corporation), or any suitable combination thereof. Within the social network, entities may be associated with a user by relationship data maintained by one or more server machines that facilitate provision of the one or more social network services. The server machines may maintain information that describes an entity as profile data (e.g., a profile) of the entity.

Multiple social network services may be implemented by different server machines or different groups of server machines. The social network of a user may be represented, in whole or in part, by the one or more social network services contemporaneously (e.g., simultaneously). Accordingly, a user may use (e.g., subscribe to) different social network services at the same time.

SUMMARY

Innovative aspects of the subject matter described in this disclosure may be embodied in methods that include the actions of accessing exploration configuration data usable to configure an exploration of at least a portion of a social network of a user, the social network representing a plurality of relationships among a plurality of entities associated with the user by one or more social network services, the exploration configuration data including a profile parameter that is descriptive of at least some of the plurality of entities, and including a path parameter specifying the portion of the social network to be explored, performing the exploration of at least the portion of the social network, the exploration being configured by the path parameter and including a retrieval of profile data that is descriptive of at least some of the plurality of entities, the retrieval being based on the profile parameter, and identifying one or more entities among the plurality of entities as being described by the profile parameter, the identifying being based on the exploration as configured by the exploration configuration data. Other implementations of this aspect include corresponding systems, apparatus, and computer programs, configured to perform the actions of the methods, encoded on computer storage devices.

These and other implementations may each optionally include one or more of the following features. For instance, actions further include: performing an interaction on behalf of the user with respect to at least one entity of the one or more entities identified as being described by the profile parameter; the interaction includes at least one of: submitting a public contribution to a webpage of the at least one entity, sending a private message to the at least one entity via a social network service of the one or more social network services, indicating that the user endorses an interaction published by the at least one entity, submitting a comment on the interaction published by the at least one entity, submitting a descriptor for the interaction published by the at least one entity, requesting removal of the descriptor for the interaction published by the at least one entity, accessing a public portion of a profile of the at least one entity, accessing a restricted portion of the profile of the at least one entity, accessing a private portion of the profile of the at least one entity, and accessing a further profile for a further entity that is referenced by the profile of the at least one entity; the interaction includes at least one of: identifying media associated with the at least one entity to the user, and communicating an alert to the user regarding the at least one entity; performing the interaction includes at least one of: protecting an identity of the user from the at least one entity, and protecting an identity of the at least one entity from the user; actions further include: receiving an authorization from the at least one entity to perform the interaction, wherein the interaction is performed in response to receiving the authorization; actions further include communicating a request to the at least one entity for the authorization to perform the interaction, wherein receiving the authorization is in response to communicating the request; actions further include: accessing preference data of the at least one entity from the social network service, wherein communicating the request for the authorization is based on the preference data of the at least one entity; the path parameter specifies a threshold social quality of a relationship between the user and the at least one entity identified as being described by the profile parameter, and performing of the exploration is based on the threshold social quality; actions further include: determining a further social quality based on a count of entities between the user and the at least one entity within the social network, wherein performing the exploration is based on a comparison of the further social quality to the threshold social quality; the threshold social quality is expressed as a count of entities in the social network between the user and the at least one entity, the count of entities being at least one of a maximum count or a minimum count; actions further include: determining the social quality based on a degree of strength of a relationship as indicated by the one or more social network services, the relationship being between at least two of: the user, the entity, and a further entity in the at least some of the plurality of entities; the threshold social quality is at least one of a maximum degree of strength or a minimum degree of strength; determining the social quality is based on a sum of multiple degrees of strength for multiple relationships as indicated by the one or more social network services among at least some of the plurality of entities; determining the social quality is based on an average of multiple degrees of strength for multiple relationships as indicated by the one or more social network services among at least some of the plurality of entities; actions further include determining the social quality based on a degree of influence held over the at least one entity by a further entity in the at least some of the plurality of entities as indicated by the one or more social network services; the path parameter is a constraint provided by the user, and performing the exploration is limited to the portion of the social network; the path parameter is a preference of the user, and performing the exploration exceeds the portion of the social network; and at least some of the plurality of entities are indirectly associated with the user by the one or more social network services.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Implementations are illustrated by way of example and not limitation in the figures of the accompanying drawings.

DETAILED DESCRIPTION

Figure 1:
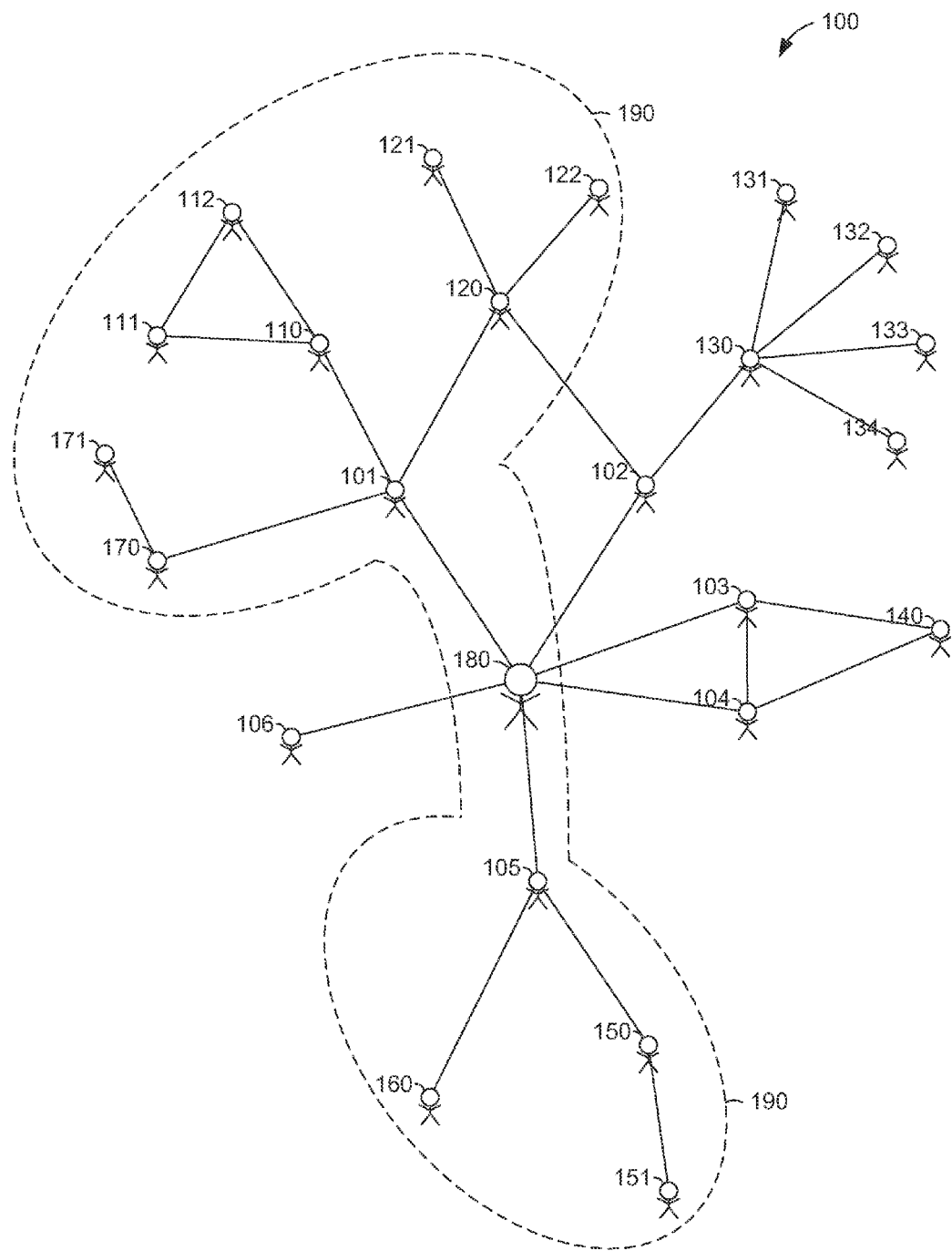
FIG. 1 is a conceptual diagram of socially networked entities and relationships among them in a social network of a user, according to some example implementations.

Example methods and systems are directed to exploration of the social network of a user. Examples provide implementation variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example implementations. It will be evident, however, that the present subject matter may be practiced without these specific details.

A machine may be configured as a social network exploration machine to explore a social network of a user (e.g., of the social network exploration machine). As used herein, "exploration" of the social network of the user is a process of discovering (e.g., finding) entities directly or indirectly associated with the user and information about those entities (e.g., profiles). A social network of the user may be represented by relationship data and profile data for multiple entities that are directly or indirectly associated with the user (e.g., entities that are socially networked with the user) by one or more social network services. The relationship data represents social relationships between the user and entities that are associated with the user by at least one social network service. The profile data in the social network data describes the entities that are associated with the user. Different social network services may provide different related services (e.g., interaction services, profile services, or data management services) with respect to at least part of the social network of the user, and the different social network services may associate different groups of entities (e.g., overlapping groups or separate groups) with the user. The entities directly or indirectly associated with the user may collectively constitute a single social network of the user (e.g., an extended social network of direct and indirect connections, followers, subscribers, or contacts).

Exploration of the social network may be performed by following one or more chains of relationships between the user and associated entities, and an exploration (e.g., a process of exploring) the social network may be configured to occur in a certain manner. In exploring the social network of the user, the social network exploration machine may access "exploration configuration data" that is usable to configure an exploration of at least part of the social network of the user. The exploration configuration data includes one or more "path parameters" that influence or control the exploration of the social network. As used herein, a path parameter is a piece of information usable to influence a virtual path through the social network (e.g., from entity to entity) taken in exploring the social network. For example, a path parameter may impose one or more constraints on the social network exploration machine (e.g., "explore at least half of the entities directly associated with each entity found," "explore at least 500 entities located in San Francisco or directly associated with an entity located in San Francisco," "do not explore further than five entities away from the user," "do not explore more than 100 entities with mailing addresses in Iowa," "explore only contacts of the user and a particular entity," or "do not explore contacts of an entity that has set a preference indicating not to explore her contacts"). As another example, a path parameter may specify a preference of the user for exploring the social network in a certain order (e.g., breadth first, depth first, or in order of relevance to a keyword). As a further example, a path parameter may specify a termination condition for terminating the exploration of the social network based on a characteristic of an entity (e.g., "stop at the first entity with expertise in this topic"), a number of entities explored (e.g., "stop at the 1000th entity"), an occurrence of an event (e.g., "stop after 100 entities have responded to the invitation"), or any suitable combination thereof.

The exploration configuration data may also include one or more "profile parameters" that specify characteristics of entities in the social network of the user. As used herein, a profile parameter is a piece of information usable to identify at least one characteristic of an entity in the social network. Each entity may have a corresponding profile in the profile data, where the profile describes the entity. In the profile data, each profile includes one or more attributes, where an attribute may have any of multiple values for that attribute (e.g., values valid for the attribute). An attribute and its value for a given entity describe something about the given entity (e.g., a characteristic of the entity). For example, an attribute may be "phone number," and the value of the attribute may be numerals that constitute a phone number for the entity (e.g., a contact). As another example, an attribute may be "occupation," and the value of the attribute may be a job description or title for the entity (e.g., "doctor," "computer technician," or "student"). As yet another example, an attribute may be "is contacts with," and the value of the attribute may be a list of identifiers (e.g., names, usernames, or codes) that correspond to entities who are contacts of the entity. As a further example, an attribute may be "contacts who are single," and the value of the attribute may be a list of identifiers corresponding to entities who are both single and contacts of the entity. As a still further example, an attribute may be "expertise," and the value of the attribute may be a list of subjects, topics, hobbies, or activities in which the entity is an expert (e.g., subjects in which the user has previously provided well-rated answers to questions). As a yet further example, an attribute may be "went to high school with," and the value of the attribute may be a list of identifiers corresponding to entities who were high school classmates of the entity. Accordingly, a profile parameter may include an attribute, a value of that attribute within the profile of an entity, a value that is valid for that attribute (e.g., but not actually used in any profiles), a range of values that are valid for the attribute, or any suitable combination thereof.

As configured by one or more path parameters in the exploration configuration data, the exploration of the social network by the social network exploration machine may identify one or more entities among the entities in the social network as being described by one or more profile parameters in the exploration configuration data. This may have the effect of performing a search of the entities within the social network by crawling (e.g., traversing) the social network in a particular manner specified by a path parameter, where the search of the entities returns results that identify those entities found according to the path parameters that have characteristics specified by a profile parameter. Having identified those entities, the social network exploration machine may then perform one or more actions with respect to those entities. The one or more actions may be performed on behalf of the user.

In some implementations, the profile data and/or the relationship data can be publicly available data. In some implementations, the profile data and/or the relationship data includes data that is authorized by users and/or entities for retrieval, processing and/or other uses discussed herein. In some implementations, users and/or entities can opt into or opt out of participation and/or use of associated data in manners discussed herein.

FIG. 1 is a conceptual diagram of socially networked entities 101-171 and relationships among them in a social network 100 of a user 180, according to some example implementations. The entities 101-171 are associated with the user 180, directly or indirectly, by one or more social network services. As used herein, a social network service that provides the user 180 with functionality (e.g., actions) pertinent to social relationships with one or more entities (e.g., entity 101) arranged as all or part of a social network of the user 180. For example, the user 180 may be directly associated with the entities 101-106 by a particular social network service, and the user 180 may be indirectly associated with the entities 110-171 by the same particular social network service. As another example, the entity 101 may be directly associated with the user 180 by one social network service, while the entity 110 is indirectly associated with the user 180 by another social network service. As a further example, the entity 101 may be directly associated with the user 180 by a first social network service, while the entity 102 is directly associated with the user 180 by a second social network service. Collectively, the entities 101-171 may constitute a single social network of the user 180 (e.g., an extended social network of direct and indirect connections, followers, subscribers, or contacts).

As shown, the user 180 and each of the entities 101-171 may be treated as a node within a network (e.g., a virtual mesh, web, or map) of social relationships that constitute the social network 100. The lines shown between entities (e.g., between entity 101 and entity 110) represent social relationships and may be treated as segments of one or more paths (e.g., virtual paths) that may be traversed through the social network 100. Accordingly, the social network 100 may be explored (e.g., by a social network exploration machine) by traversing the one or more paths through the social network 100.

As noted above, an exploration of the social network 100 may be configured by exploration configuration data. In particular, one or more path parameters in the exploration configuration data may confine the exploration of the social network 100 to one or more portions of the social network 100. A portion 190 of the social network 100 is shown in FIG. 1 to illustrate that exploration configuration data may impose one or more constraints on the exploration of the social network 100. As configured by the one or more path parameters in the exploration configuration data, the portion 190 that is explored may include the entities 101, 105, 110, 111, 112, 120, 121, 122, 150, 151, 160, 170, and 171. In some example implementations, the user 180 is treated as being included in the portion 190 of the social network 100 that is subject to the exploration (e.g., by a social network exploration machine) as configured by the one or more path parameters.

Figure 2:
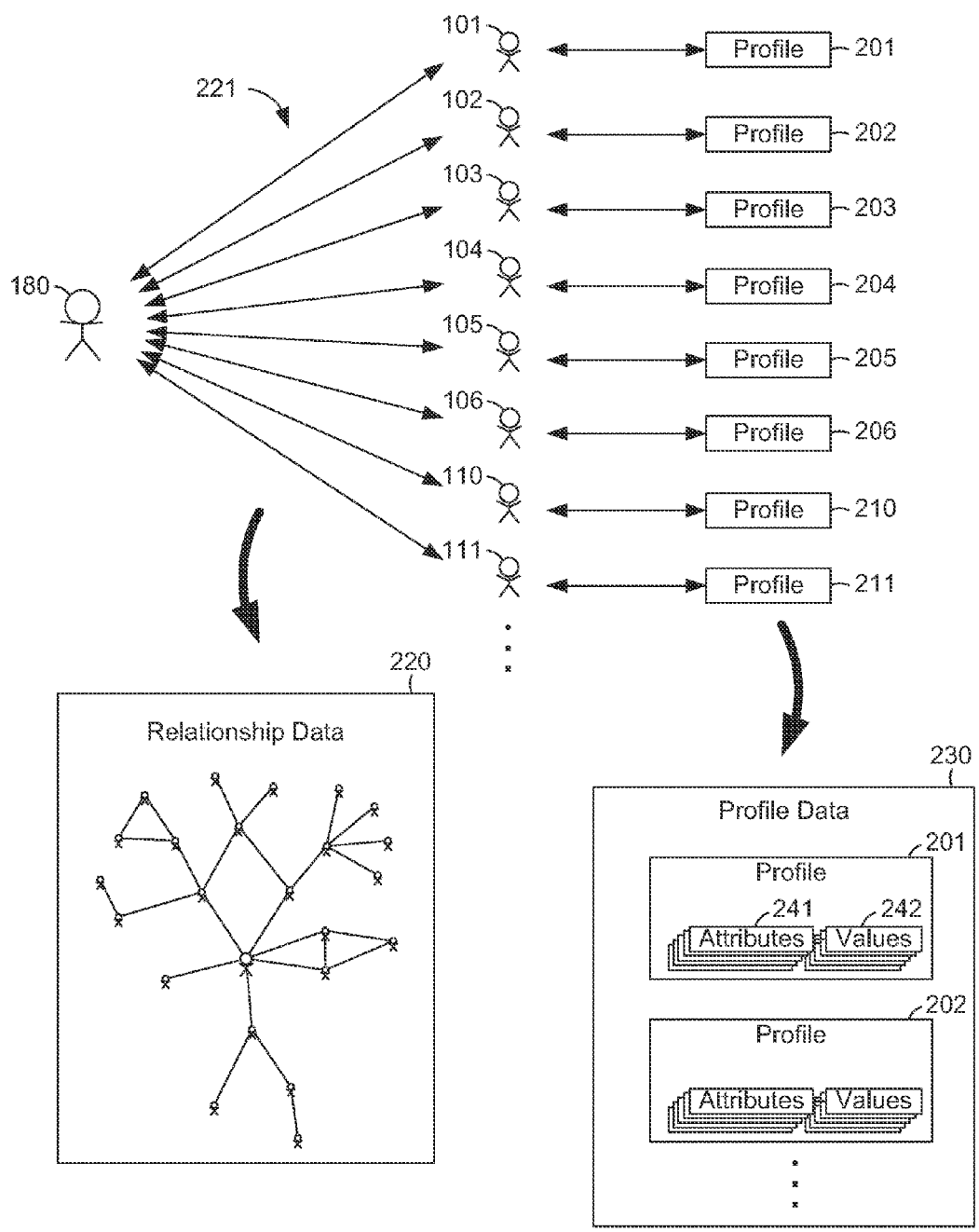
FIG. 2 is a conceptual diagram of social relationships being represented by relationship data and descriptive information of entities being represented by profile data, according some example implementations.

FIG. 2 is a conceptual diagram of social relationships 221 being represented by relationship data 220 and descriptive information of entities (e.g., entities 101-111) being represented by profile data 230, according some example implementations. The relationships 221 may be represented within the relationship data 220 as direct associations or indirect associations (e.g., chains of relationships). Moreover, the relationship data 220 may include details of a relationship between the user 180 and an entity (e.g., entity 111). For example, the relationship data 220 may include details that identify one or more social networks involved in a chain of relationships connecting the user 180 with the entity. As another example, the relationship data 220 may include details that identify one or more entities (e.g., entities 101 and 110) in the chain of relationships connecting the user 180 with the entity. Furthermore, the relationship data 220 may be discovered and collected (e.g., stored within a database) by the social network exploration machine from various server machines of multiple social network services.

As shown in FIG. 2, the entities 101-111 may be described, respectively, by the profiles 201-211. The profiles 201-211 may be discovered by the social network exploration machine during its exploration of the social network 100, and one or more of the profiles 201-211 may be collected (e.g., stored within a database) to generate all or part of the profile data 230. As with the relationship data 220, the profile data 230 may be discovered and collected (e.g., stored within a database) by the social network exploration machine from various server machines of multiple social network services. Shown as a collection of profiles, the profile data 230 includes individual profiles (e.g., profiles 201 and 202) of entities (e.g., entities 101 and 102). The profile 201, for example, is descriptive of the entity 101 and includes one or more attributes 241, as well as corresponding values 242 of the attributes 241, where the values 242 are descriptive of the entity 101. In combination, the relationship data 220 and the profile data 230 described (e.g., define) the social network 100 of the user 180.

Figure 3:
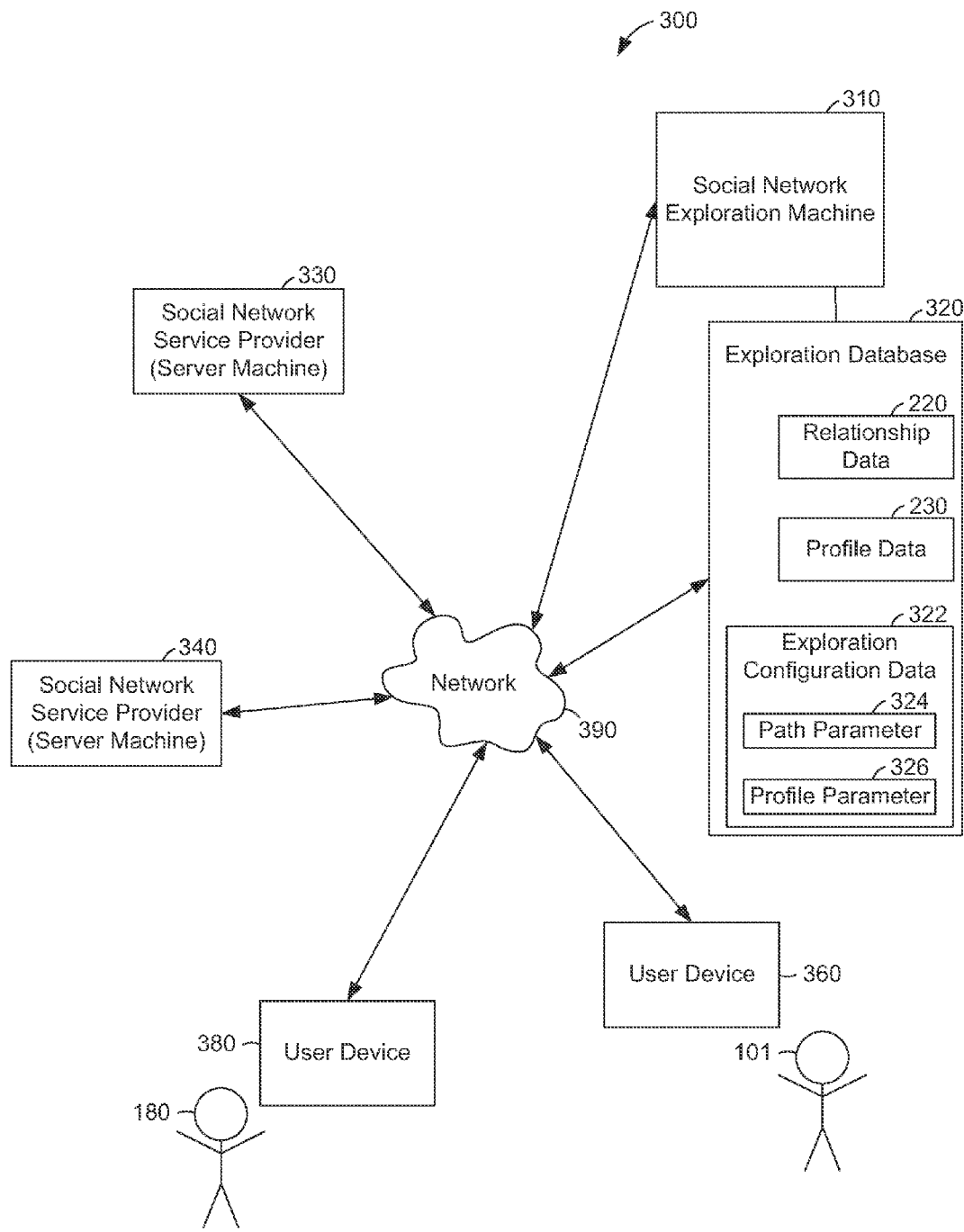
FIG. 3 is a network diagram illustrating a network environment suitable for exploring a social network of a user, according to some example implementations.

FIG. 3 is a network diagram illustrating a network environment 300 suitable for exploring the social network 100 of the user 180, according to some example implementations. The network environment 300 includes a social network exploration machine 310, an exploration database 320, social network service providers 330 and 340 (e.g., server machines), and user devices 360 and 380, all communicatively coupled to each other via a network 390.

The social network exploration machine 310 may be implemented in a computer system, as described below with respect to FIG. 8, and configured by software modules, as described below with respect to FIG. 4. The social network exploration machine 310 may explore all or part of the social network 100 of the user 180 by performing one or more the methodologies described below with respect to FIG. 5-7.

The exploration database 320 is a data repository that stores information (e.g., as electronic data). For example, the exploration database 320 may store the relationship data 220, the profile data 230, some exploration configuration data 322 usable to configure the exploration of the social network 100, or any suitable combination thereof. The social network service providers 330 and 340 may be server machines (e.g., computer systems) to facilitate provision of one or more social network services. In some example implementations, the exploration database 320 is implemented as a database server machine accessible by the social network exploration machine 310 via the network 390. In certain example implementations, the exploration database 320 is physically connected to, or a part of, the social network exploration machine 310.

The exploration configuration data 322 is usable (e.g., by the social network exploration machine 310) to configure an exploration of the social network 100, including any part thereof (e.g., portion 190 of the social network 100). As shown, the exploration configuration data 322 includes a path parameter 324 and a profile parameter 326. The exploration configuration data 322 may include multiple path parameters, multiple profile parameters, or both.

The path parameter 324 specifies one or more criteria applicable to the relationship data 220, where the one or more criteria define which relationships between entities (e.g., segments between nodes) are to be included in the portion 190 of the social network 100 to be explored. For example, the path parameter 324 may specify a maximum length of the shortest path to the user 180 (e.g., three segments or two entities). As another example, the path parameter 324 may specify a social quality of the social relationship between the user 180 and an entity (e.g., entity 111) within the social network 100 (e.g., a minimum social quality, a maximum social quality, an average social quality, or a sum of social qualities). As used herein, a "social quality" is a representation (e.g., a relative measurement or estimation) of one or more interpersonal characteristics of the social relationship between two entities. Accordingly, a social quality may represent a symmetric quality that is bidirectional or mutually shared between the two entities (e.g., closeness, intimacy, or number of years of friendship) or an asymmetric quality that is unidirectional or non-shared between the two entities (e.g., authority, respect, trust, or dependence). A social quality may be expressed in terms of a count of entities (e.g., three entities), a degree of strength of the relationship between entities (e.g., as indicated by a social network service), a degree of influence held over one entity by another entity (e.g., held among best friends, held by a mentor over a mentee, held by a celebrity over a fan, or held by a parent over a child), or any suitable combination thereof. According to various example implementations, the path parameter 324 may be a preference of the user 180, a submission originated by the user 180 (e.g., using the user device 380), a suggestion presented to the user 180, or any suitable combination thereof.

The profile parameter 326 specifies one or more criteria applicable to the profile data 230, where the one or more criteria are a basis for identification of one or more entities (e.g., entities 111 and 151) in the portion 190 of the social network 100 as corresponding (e.g., matching or semantically similar) to the profile parameter 326. For example, the profile parameter 326 may specify a demographic criterion (e.g., age, sex, location, marital status, language, or occupation) for the identification of entities. As another example, the profile parameter 326 may specify one or more values (e.g., values 242) for an attribute (e.g., one of the attributes 241) that, if present in the profile (e.g., profile 201) of an entity (e.g., entity 101), identifies that entity (e.g., "visited Mt. Rushmore=true," "number of years playing golf>10," or "level of expertise in calculus is 'intermediate' or 'advanced'"). According to various example implementations, the profile parameter 326 may be a preference of the user 180, a submission originated by the user 180 (e.g., using the user device 380), a suggestion presented to the user 180, or any suitable combination thereof.

Also shown in FIG. 3 are the user 180 and the entity 101. One or both of the user 180 and the entity 101 may be a human user (e.g., a human being), a machine user (e.g., software program configured to interact with the user device 360), or any suitable combination thereof (e.g., a human assisted by a machine). The user 180 is not part of the network environment 300, but is associated with the user device 380 and may be a user of the user device 380. For example, the user device 380 may be a deskside computer, a tablet computer, or a smart phone belonging to the user 180. Similarly, the entity 101 is not part of the network environment 300, but is associated with the user device 360. As an example, the user device 360 may be a tablet computer belonging to the entity 101.

Any of the machines, databases, or devices shown in FIG. 3 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 8. As used herein, a "database" is a data storage resource and may store data structured as a text file, a table, a spreadsheet, a relational database, a triple store, or any suitable combination thereof. Moreover, any two or more of the machines illustrated in FIG. 3 may be combined into a single machine, and the functions described herein for any single machine may be subdivided among multiple machines.

The network 390 may be any network that enables communication between machines (e.g., social network exploration machine 310 and the user device 380). Accordingly, the network 390 may be a wired network, a wireless network, or any suitable combination thereof. The network 390 may include one or more portions that constitute a private network, a public network (e.g., the Internet), or any suitable combination thereof.

Figure 4:
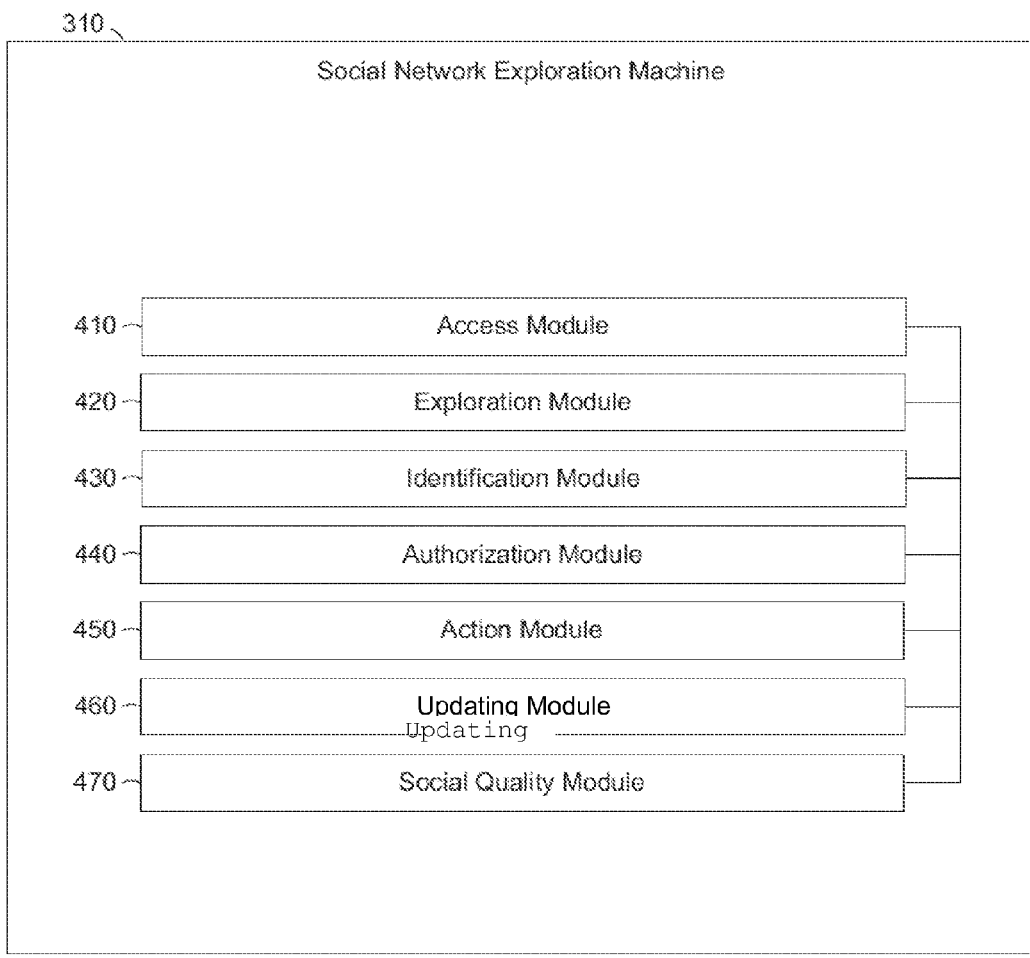
FIG. 4 is a block diagram illustrating components of a social network exploration machine configured to explore the social network of the user, according to some example implementations.

FIG. 4 is a block diagram illustrating components of the social network exploration machine 310, as configured (e.g., by special software) to perform exploration of the social network 100 of the user 180, according to some example implementations. As noted above, the exploration of the social network 100 may be configured by the exploration configuration data 322, which may be stored in the exploration database 320.

The social network exploration machine 310 includes an access module 410, an exploration module 420, an identification module 430, an authorization module 440, an action module 450, an updating module 460, and a social quality module 470, all configured to communicate with each other (e.g., via a bus, shared memory, or a switch). Any one or more of the modules described herein may be implemented using hardware (e.g., a processor of a machine) or a combination of hardware and software. Moreover, any two or more of these modules may be combined into a single module, and the functions described herein for a single module may be subdivided among multiple modules.

The access module 410 of the social network exploration machine 310 is configured to access the exploration configuration data 322. The exploration configuration data 322 may be accessed from the exploration database 320 (e.g., by reading the exploration database 320). In some example implementations, the exploration configuration data 322 is stored in a memory of the social network exploration machine 310, and the access module 410 reads the exploration configuration data 322 from the memory. As noted above, the exploration configuration data 322 may include one or more profile parameters (e.g., profile parameter 326) that describe one or more entities (e.g., entity 111) in the social network 100. Moreover, the exploration configuration data 322 may include one or more path parameters (e.g., path parameter 324) that specify the portion 190 of the social network 100 to be explored.

The exploration module 420 of the social network exploration machine 310 is configured to perform an exploration of at least the portion 190 of the social network 100. The exploration is configured (e.g., defined or limited) by the one or more path parameters (e.g., path parameter 324) within the exploration configuration data 322, and the exploration includes a retrieval of profile data (e.g., profile 211) that describes at least some of the entities (e.g., entity 111) in the social network 100. In some example implementations, the retrieval of the profile data may be based on the one or more profile parameters (e.g., profile parameter 326) within the exploration configuration data 322. This may have the effect of retrieving only those profiles having a value of an attribute that matches or is semantically similar to the criteria and in the profile parameter 326. In other example implementations, exploration retrieves the profiles of all entities in the portion 190 explored (e.g., for processing by the identification module 430).

As an example, the user 180 may wish to invite local contacts who enjoy scuba diving to attend a weekend diving event with the user 180. Accordingly, the user 180 may set the path parameter 324 to specify that the exploration of the social network 100 should be limited to those entities that are located within 50 miles of the user 180. Additionally, the user 180 may set the profile parameter 326 to specify that the profiles of the entities identified by the exploration of the social network 100 should include the value "SCUBA" or the value "diving" for the attribute "hobbies." In this example, the exploration module 420 performs the exploration of the social network 100, where the exploration is limited to the portion 190 by the path parameter 324. As part of performing the exploration, the exploration module 420 retrieves one or more profiles of those entities explored (e.g., entity 111 and 151) within the portion 190 of the social network 100. For this example, it is hypothetically assumed that the entities 111 and 151 have listed either "SCUBA" or "diving" as "hobbies" in their respective profiles (e.g., profile 211).

The identification module 430 of the social network exploration machine 310 is configured to identify one or more entities in the social network 100 (e.g., in the portion 190 of the social network 100) as being described by the profile parameter 326. The identifying of the one or more entities is based on the exploration of the social network 100, or the portion 190 thereof, performed by the exploration module 420. Moreover, the identifying of the one or more entities may be based on the one or more profiles retrieved by the exploration module 420. Continuing the previous example, after the exploration module 420 has retrieved profiles for the entities 111 and 151, the identification module 430 identifies the entities 111 and 151 as being described by the value "SCUBA" or "diving" for the attribute "hobbies." In the process of identifying the entities 111 and 151, the identification module 430 may search through all profiles retrieved by the exploration module 420, which may be significantly larger in number than the two profiles for the entities 111 and 151. Based on this identification of the entities 111 and 151, the identification module 430 may present the user 180 with a suggestion that the entities 111 and 151 be invited to the weekend diving event.

In some implementations, the social network exploration machine 310 may take one or more actions with respect to the identified entities (e.g., entities 111 and 151) on behalf of the user 180. The authorization module 440 of the social network exploration machine 310 is configured to access preferences (e.g., data access control) of an entity (e.g., entity 111). The entity may be one of the entities identified by the identification module 430. The preference data may be accessed from a social network service of which the entity is a user, and the social network service may be the same one used by the user 180 or a different social network service. For example, the preference data may be stored as a preference of the entity (e.g., to only allow certain actions to be performed by other entities, or to allow only certain entities to perform actions).

Based on the preferences (e.g., data access control) of the entity, the authorization module 440 may communicate a request to the entity for authorization to perform an action with respect to the entity. In response to the communicated request, the authorization module 440 may receive an authorization to perform the action from the entity. Once received, the authorization may be communicated by the authorization module 440 to the action module 450.

The action module 450 of the social network exploration machine 310 is configured to perform an action with respect to an entity (e.g., entity 111) on behalf of the user 180. As noted above, the entity may be one of the entities identified by the identification module 430. The performing of the action may be in response to the receiving of the authorization by the authorization module 440, in response to communication of the authorization from the authorization module 440 to the action module 450, or any suitable combination thereof. According to various example implementations, the performing of the action may include protecting an identity of the user 180 (e.g., withholding a name, a username, or an identity of the user 180) from the entity, protecting an identity of the entity (e.g., withholding a name, a username, or an identity of the entity) from the user 180, or both.

The updating module 460 of the social network exploration machine 310 is configured to perform an updating operation that accesses the profile (e.g., profile 211) of an entity (e.g., entity 111) on a repeating or recurring basis. Accordingly, the updating operation may access the profile periodically (e.g., daily, weekly, monthly, or yearly) or in response to one or more events (e.g., holidays, updates, birthdays, or news pertinent to the entity). This may have the effect of providing the user 180 with updates or news about the entity as such information becomes available or soon thereafter. The updating operation may be initiated by the action module 450.

The social quality module 470 of the social network exploration machine 310 is configured to determine a social quality of the social relationship between the user 180 and an entity (e.g., entity 111) in the social network 100, a social quality of the social relationship between two entities (e.g., entity 111 and 171) in the social network 100, or any suitable combination thereof. The social quality may be determined based on a count of entities between two entities (e.g., between the user 180 and the entity 111) within the social network 100. As another example, the social quality may be determined based on a degree of strength of the relationship between two entities within the social network 100. Degrees of strength for relationships may be values of an attribute for "longevity of relationship" (e.g., expressed in years that the two entities have known each other), "frequency of contact," "mutual contacts" (e.g., expressed as a number of directly connected entities shared in common), or any suitable combination thereof. As a further example, the social quality may be determined based on a degree of influence held over one entity by another entity within the social network 100. Degrees of influence may be values of an attribute for "trust" (e.g., expressed as a number of instances where one entity provided useful advice to the other entity), "respect" (e.g., expressed as a self-reported score), "authority" (e.g., expressed as a position within a hierarchy), or any suitable combination thereof.

Figure 5:
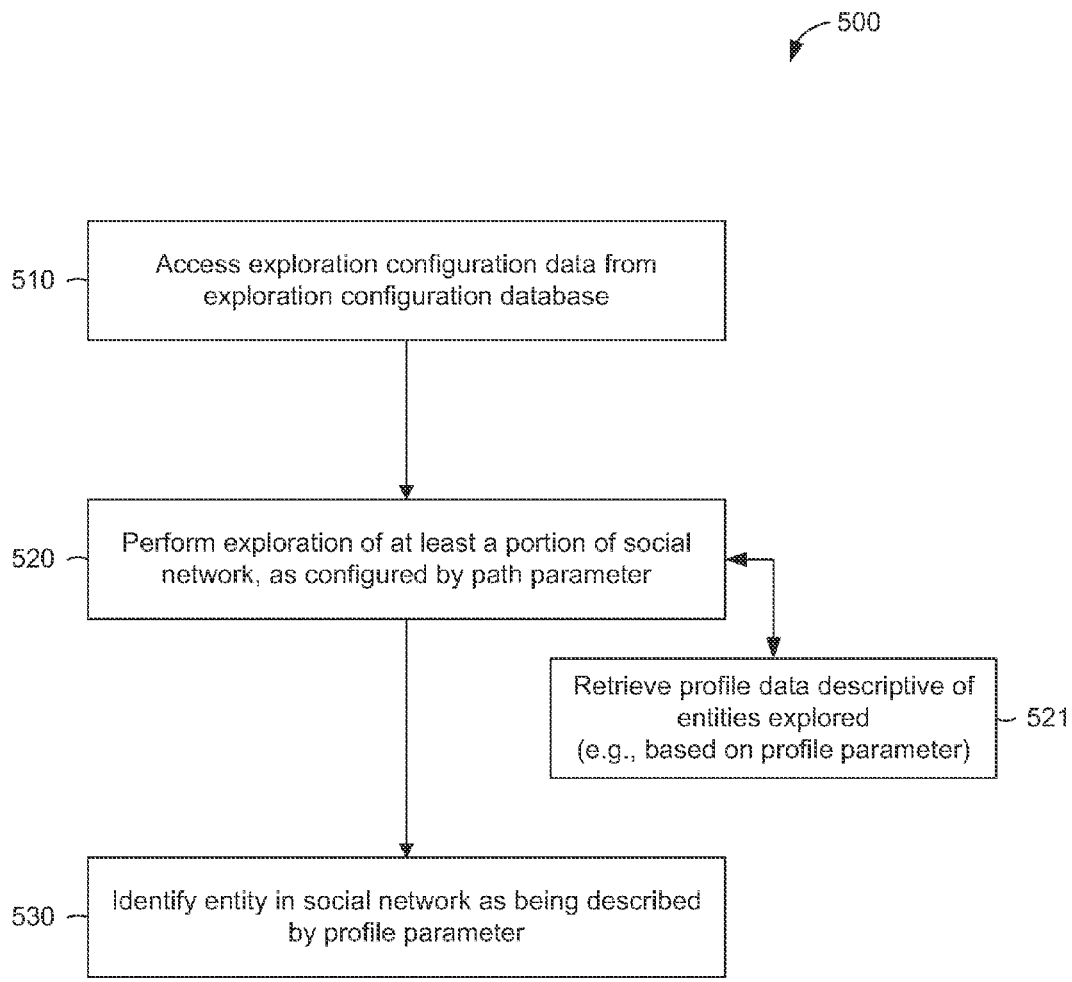
FIG. 5-6 are flowcharts illustrating operations in a method of exploring the social network of a user, according to some example implementations.
Figure 6:
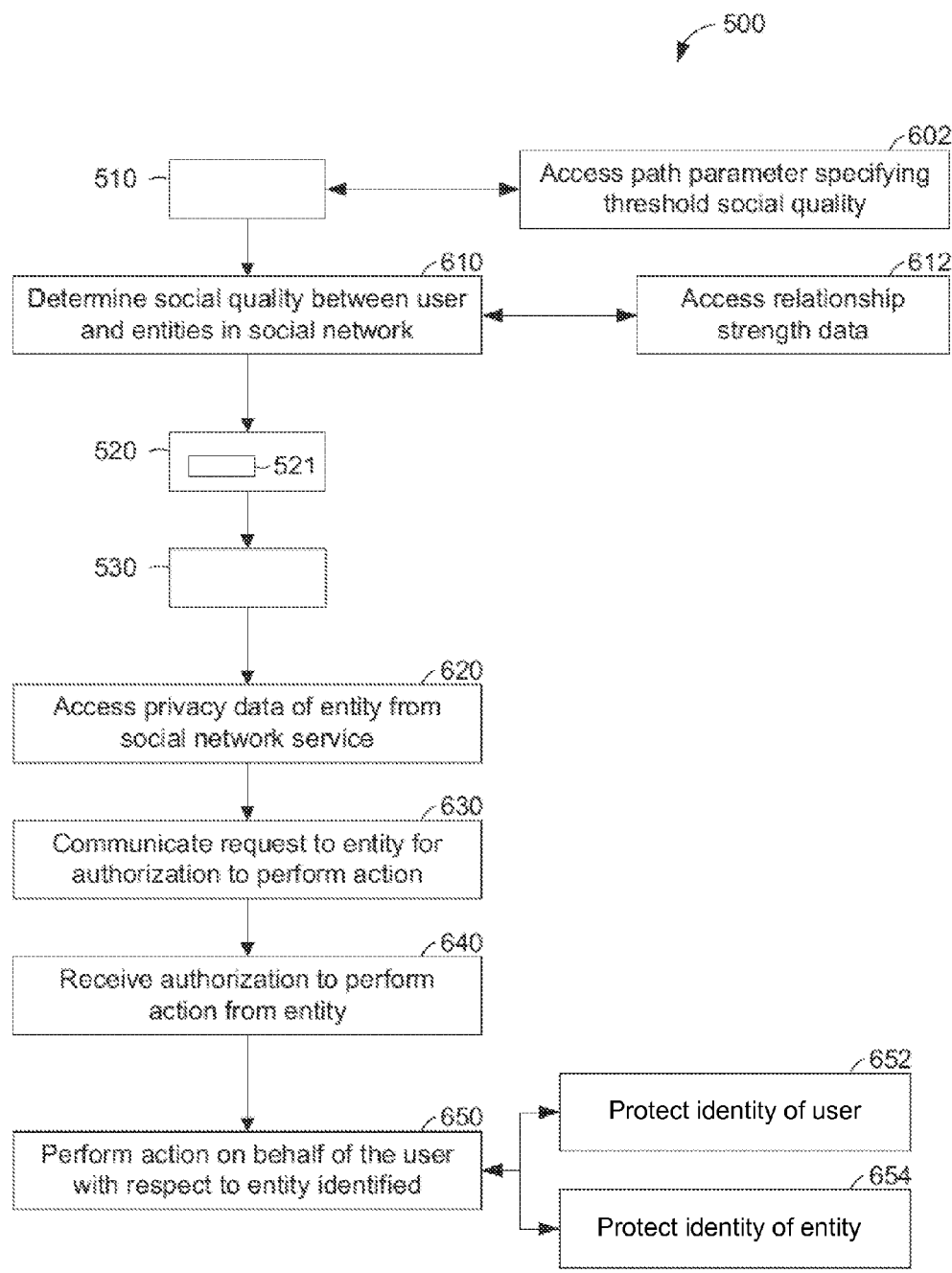

FIG. 5-6 are flowcharts illustrating operations in a method 500 of exploring at least the portion 190 of the social network 100 of the user 180, according to some example implementations. Operations in a method 500 may be performed by the social network exploration machine 310, using modules described above with respect to FIG. 4.

As shown in FIG. 5, the method 500 includes operations 510, 520, 521, and 530. Operation 521 may be performed as part of (e.g., a parallel task, a post-processing job, a subroutine, or a portion) of operation 520.

In operation 510, the access module 410 of the social network exploration machine 310 accesses the exploration configuration data 322 (e.g., from the exploration database 320). As noted above, the exploration configuration data 322 includes the profile parameter 326 and the path parameter 324. The exploration configuration data 322 configures an exploration of at least part of the social network 100 (e.g., by limiting the exploration to the portion 190 of the social network 100).

In operation 520, the exploration module 420 of the social network exploration machine 310 performs the exploration of the portion 190 of the social network 100, as configured by the exploration configuration data 322. As shown in FIG. 5, operation 521 may be included in operation 520.

In operation 521, the exploration module 420 retrieves profile data (e.g., profiles) corresponding to one or more of the entities explored. In some example implementations, all profiles of all entities explored are retrieved. In other example implementations, only those profiles that fit the profile parameter 326 (e.g., have a value of an attribute that matches or is semantically similar to a criterion in the profile parameter 326) are retrieved by the exploration module 420.

In operation 530, the identification module 430 of the social network exploration machine 310 identifies an entity (e.g., at least one entity) among the entities explored (e.g., entities 101, 105, 110-112, 120-122, 150, 151, 160, 170, a and 171) in operation 520. The identification of the entity (e.g., entity 111) is based on the exploration performed in operation 520, as configured by the exploration configuration data 322.

As shown in FIG. 6, the method 500 may further include one or more of operations 602-654. One or more of the operation 602-54 may be performed by the social network exploration machine 310, using modules described above with respect to FIG. 4.

Operation 602 may be performed as part of (e.g., a parallel task, a post-processing job, a subroutine, or a portion) of operation 510. In operation 602, the access module 410 of the social network exploration machine 310, in accessing the exploration configuration data 322, accesses the path parameter 324. According to some example implementations, the path parameter 324 specifies a threshold social quality (e.g., a minimum social quality, a maximum social quality, an average social quality, a sum of social qualities) that may be used for comparison against a determined social quality of a social relationship between entities (e.g., entities 111 and 171). In various example implementations, the threshold social quality is a threshold social distance expressed as, or based on, a threshold count of entities between two entities (e.g., between the user 180 and the entity 111) within the social network 100. In certain example implementations, the threshold social quality is expressed as, or based on, a threshold degree of strength (e.g., a maximum degree of strength or a minimum degree of strength) for relationships between entities within the social network 100. Furthermore, according to various example implementations, the threshold social quality is expressed as, or based on, a threshold degree of influence (e.g., a maximum degree of influence or a minimum degree of influence) held over one entity by another entity within the social network 100.

In operation 610, the social quality module 470 of the social network exploration machine 310 determines a social quality of the social relationship between two entities (e.g., user 180 and entity 111, or entity 111 and entity 171) in the social network 100. Operation 610 may be repeated for any number of pairs of entities in the social network 100. The social quality may be a social distance determined as, or based on, a count of entities between the two entities. As another example, the social quality may be determined as, or based on, a degree of strength of the relationship between the two entities, as indicated by the social network service associating the two entities. As yet another example, the social quality may be determined as, or based on, a sum of multiple degrees of strength for multiple relationships (e.g., as indicated by the social network service) in a social chain between two entities (e.g., a sum of four degrees of strength for four relationships between the entities 111 and 171). As a further example, the social quality may be determined as, or based on, an average of multiple degrees of strength for multiple relationships (e.g., as indicated by the social network service) in the social chain between two entities. As a still further example, the social quality may be determined as, or based on, a degree of influence held over one entity by another entity.

The social quality determined in operation 610 may be compared with the threshold social quality specified by the path parameter 324 accessed by the access module 410 in operation 602. This comparison of the threshold social quality to a determined social quality may be performed as part of operation 520. For example, the exploration of the social network 100 may be limited to those entities above or below the threshold social quality from the user 180.

Operation 612 may be performed as part of (e.g., a parallel task, a post-processing job, a subroutine, or a portion) of operation 610. In operation 612, the social quality module 470 accesses relationship strength data of one or more of the two entities (e.g., user 180 and entity 101) from the social qualities being determined. The relationship strength data may be accessed from one or more social network services associating the two entities. The relationship strength data may indicate a degree of strength of the relationship between the two entities, a degree of influence held over one entity by another entity, or any suitable combination thereof. Accordingly, the relationship strength data may be used in operation 610 (e.g., as a basis for determining the social quality of the relationship between the two entities).

In operation 620, the authorization module 440 of the social network exploration machine 310 accesses the preference data of an entity (e.g., entity 111) identified by the identification module 430 in operation 530. Operation 620 may be repeated for each entity identified in operation 530. The preference data may be a preference of the entity (e.g., to only allow certain actions to be performed by another entity, or to allow only certain entities to perform actions). As noted above, the preference data of the entity may be a basis for communicating a request to the entity for authorization to perform an action with respect to the entity (e.g., as described below with respect to FIG. 7).

In operation 630, the authorization module 440 of the social network exploration machine 310 communicates a request to the entity for authorization to perform an action with respect to the entity. The communication of the request may be based on the preference data of the entity accessed in operation 620 (e.g., based on a data access preference of the entity). In some example implementations, the preference data of the entity includes an authorization that allows the user 180 to perform one or more actions with respect to the entity, and accordingly, operation 630 may be omitted.

In operation 640, the authorization module 440 of the social network exploration machine 310 receives an authorization to perform the action from the entity. The receiving of the authorization may be in response to the request communicated in operation 630. In some example implementations, the preference data of the entity includes the authorization, and accordingly, operation 640 may be omitted or merged with operation 620.

In operation 650, the action module 450 of the social network exploration machine 310 performs an action on behalf of the user 180 with respect to the entity (e.g., entity 111) whose preference data was accessed in operation 620. Operation 650 may include one or both of operations 652 and 654. Further details and variations for operation 650 are described below with respect to FIG. 7.

In operation 652, the action module 450 performs the action while protecting an identity of the user 180 from the entity with respect to whom the action is performed. For example, the action module 450 may withhold (e.g., redact, delete, block, or omit) a name, a username, or an identity of the user 180 from the entity.

In operation 654, the action module 450 performs the action while protecting an identity of the entity from the user 180. For example, the action module 450 may withhold (e.g., redact, delete, block, or omit) a name, a username, or an identity of the entity from the user 180.

Figure 7:
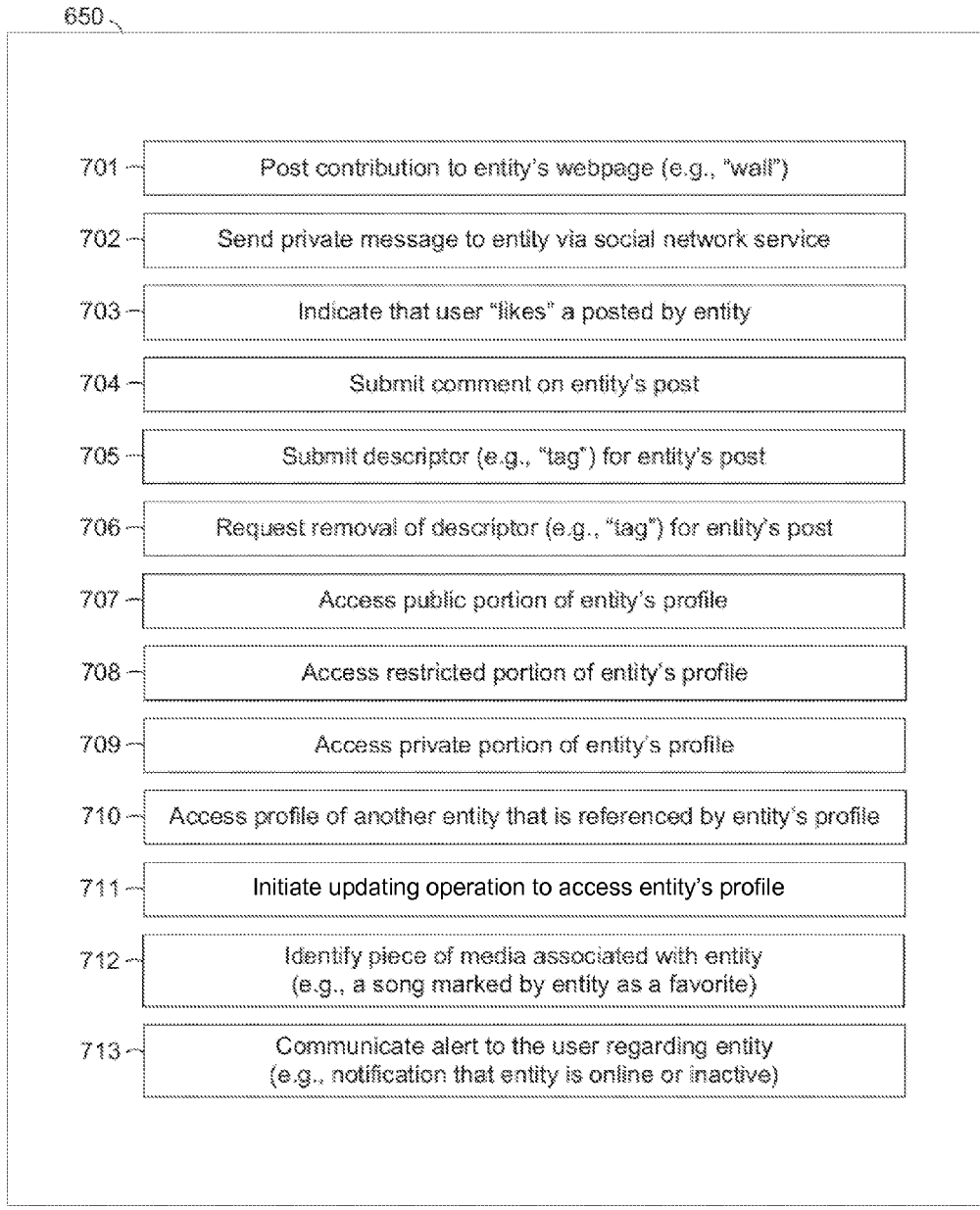
FIG. 7 is a block diagram illustrating details of an operation in the method of exploring the social network of the user, according to some example implementations.

FIG. 7 is a block diagram illustrating details of operation 650 in the method 500 of exploring at least the portion 190 of the social network 100 of the user 180, according to some example implementations. As shown, operation 650 may include one or more of operations 701-713, each of which may be performed with respect to an entity (e.g., entities 111) in the social network 100 and which may be performed on behalf of the user 180.

In operation 701, the action module 450 of the social network exploration machine 310 submits a public contribution to a webpage of the entity. For example, the action module 450 may submit a comment as a posting to a blog by the entity. As another example, the action module 450 may post a message (e.g., containing text or images) to a homepage of the entity. This may have the effect same effect as the user 180 composing and submitting the public contribution to the webpage of the entity.

In operation 702, the action module 450 sends a private message (e.g., an invitation) to the entity. The message may include text, images, video, audio, or any suitable combination thereof, and the message may be sent via the social network service associating the user 180 with the entity. This may have the effect of automating certain messages frequently sent by the user 180 (e.g., sending a message of congratulations to entities who announce weddings or engagements).

In operation 703, the action module 450 indicates that the user 180 has a positive sentiment about (e.g., "likes") an interaction published by the entity. For example, where the entity has recently published a new entry on a cumulative webpage (e.g., a blog or a wall) of the entity, and the webpage supports a tally of sentiments regarding the new comment, the action module 450 may submit a positive sentiment to the tally. This may have the same effect as the user 180 clicking a "like" button in the webpage of the entity.

In operation 704, the action module 450 submits a comment on the interaction published by the entity. For example, where the entity has recently published a new entry on her cumulative webpage, and the webpage accepts submissions of comments on the new entry, the action module 450 may submit a message (e.g., containing text or images) as a comment on the new entry. This may have the same effect as the user 180 typing and submitting the message as a comment.

In operation 705, the action module 450 submits a descriptor (e.g., a tag) to describe the interaction published by the entity. For example, where the entity has recently published a new entry on her cumulative webpage, and the webpage accepts submissions of descriptors (e.g., tags) for the new entry, the action module 450 may submit one or more descriptors as tags to describe the new entry. This may have the same effect as the user 180 typing and submitting the one or more descriptors for the new entry.

In operation 706, the action module 450 requests removal of one or more descriptors (e.g., tags) for the interaction published by the entity. For example, where the user 180 has mistakenly submitted a descriptor for the interaction, and an interface exists to request removal of that descriptor, the action module 450 may submit such a request using the interface. This may have the effect of automating one or more administrative tasks and managing descriptors authored by the user 180.

In operation 707, the action module 450 accesses a public portion of the profile (e.g., profile 211) of the entity (e.g., entity 111). In some example implementations, the action module 450 presents the public portion of the profile to the user 180 (e.g., using the user device 380). This may have the effect of automatically showing the user 180 some publicly available information about the entity identified in operation 530.

In operation 708, in some implementations, the action module 450 accesses a restricted portion of the profile (e.g., profile 211) of the entity (e.g., entity 111). Access to the restricted portion may be based on the preference data of the entity (e.g., as accessed by the authorization module 440 in operation 620). For example, the preference data of the entity may allow the user 180 access to the restricted portion of the profile. In some example implementations, the action module 450 presents the restricted portion of the profile to the user 180 (e.g., using the user device 380). This may have the effect of automatically showing the user 180 some non-publicly available information about the entity identified in operation 530.

In operation 709, in some implementations, the action module 450 accesses a private portion of the profile (e.g., profile 211) of the entity (e.g., entity 111). Access to the private portion may be based on the preference data of the entity (e.g., as accessed by the authorization module 440 in operation 620). For example, the preference data of the entity may allow the user 180 access to the private portion of the profile. In some example implementations, the action module 450 presents the private portion of the profile to the user 180 (e.g., using the user device 380). This may have the effect of automatically showing the user 180 some private information about the entity identified in operation 530.

In operation 710, the action module 450 accesses the profile of a further entity (e.g., entity 112) in the social network 100. The further entity may be referenced by the profile of the entity identified in operation 530. For example, the profile of the entity 111 may include a list of contacts that identifies the entity 112 as one of the contacts of the entity 111. Moreover, preference data of the entity 111 (e.g., as accessed in operation 620) may authorize the user 180 to access at least some portion of the profile of the entity 112 (e.g., a publicly accessible portion or a minimally restricted portion). In some example implementations, the action module 450 presents at least a portion of the profile of the further entity (e.g., entity 112) to the user 180 (e.g., using the user device 380). This may have the effect of automatically showing the user 180 some information about the further entity who is associated with the entity identified in operation 530.

In operation 711, the action module 450 initiates an updating operation configured to access the profile (e.g., profile 211) of the entity (e.g., entity 111) on a recurring basis. For example, the action module 450 may cause the updating module 460 to begin performing the updating operation. As noted above, the updating operation may access the profile periodically (e.g., daily, weekly, monthly, or yearly) or in response to one or more events (e.g., holidays, updates, birthdays, or news pertinent to the entity). This may have the effect of providing the user 180 with updates or news about the entity as such information becomes available or soon thereafter.

In operation 712, the action module 450 identifies a piece of media (e.g., a song, an image, a game, an article, or a video) to the user 180, where the piece of media is associated with the entity (e.g., marked by the entity as a favorite or added by the entity to a queue of media for viewing). The piece of media may be identified by the action module 450 based on a value of an attribute in the profile of the entity (e.g., a song title appearing in a list of favorite songs). In some example implementations, the action module 450 presents the piece of media to the user 180 (e.g., using the user device 380). This may have the effect of automatically showing the user 180 some media that is of interest to the entity (e.g., entity 111).

In operation 713, the action module 450 communicates an alert to the user 180 regarding the entity (e.g., entity 111). For example, the action module 450 may send a message (e.g., an email, a text message, a blog post, or a voicemail) indicating that the entity identified in operation 530 is available for live interaction (e.g., actively using the social network service associating the user 180 with the entity). As another example, the alert may indicate that the entity is unavailable (e.g., on vacation). As a further example, the alert may indicate the entity has recently updated her profile (e.g., profile 211) to include a new value for an attribute (e.g., a new hobby for the attribute "hobbies," or a new address for the attribute "location"). This may have the effect of notifying the user 180 that an event pertinent to the social relationship between the user 180 and the entity is occurring or has occurred recently.

According to various example implementations, one or more of the methodologies described herein may facilitate communication of information about entities in the social network 100 of the user 180. In particular, one or more of the methodologies described herein may constitute all or part of a business method (e.g., a business method implemented using a machine) that presents one or more users of the social network exploration machine 310 with information regarding entities in their respective social networks. Moreover, the presentation of such information may be performed on a recurring basis. Furthermore, performance of one or more actions with respect to one or more entities may be automated, potentially on a recurring basis.

When these effects are considered as a whole, one or more of the methodologies described herein may obviate a need for certain efforts or resources that otherwise would be involved in exploring, maintaining, managing, or interacting with a social network. Efforts expended by the user 180 in identifying entities and taking actions with respect to the identified entities may be reduced by one or more of the methodologies described herein. Computing resources used by one or more machines, databases, or devices (e.g., within the network environment 300) may similarly be reduced. Examples of such computing resources include processor cycles, network traffic, memory usage, data storage capacity, power consumption, and cooling capacity.

Figure 8:
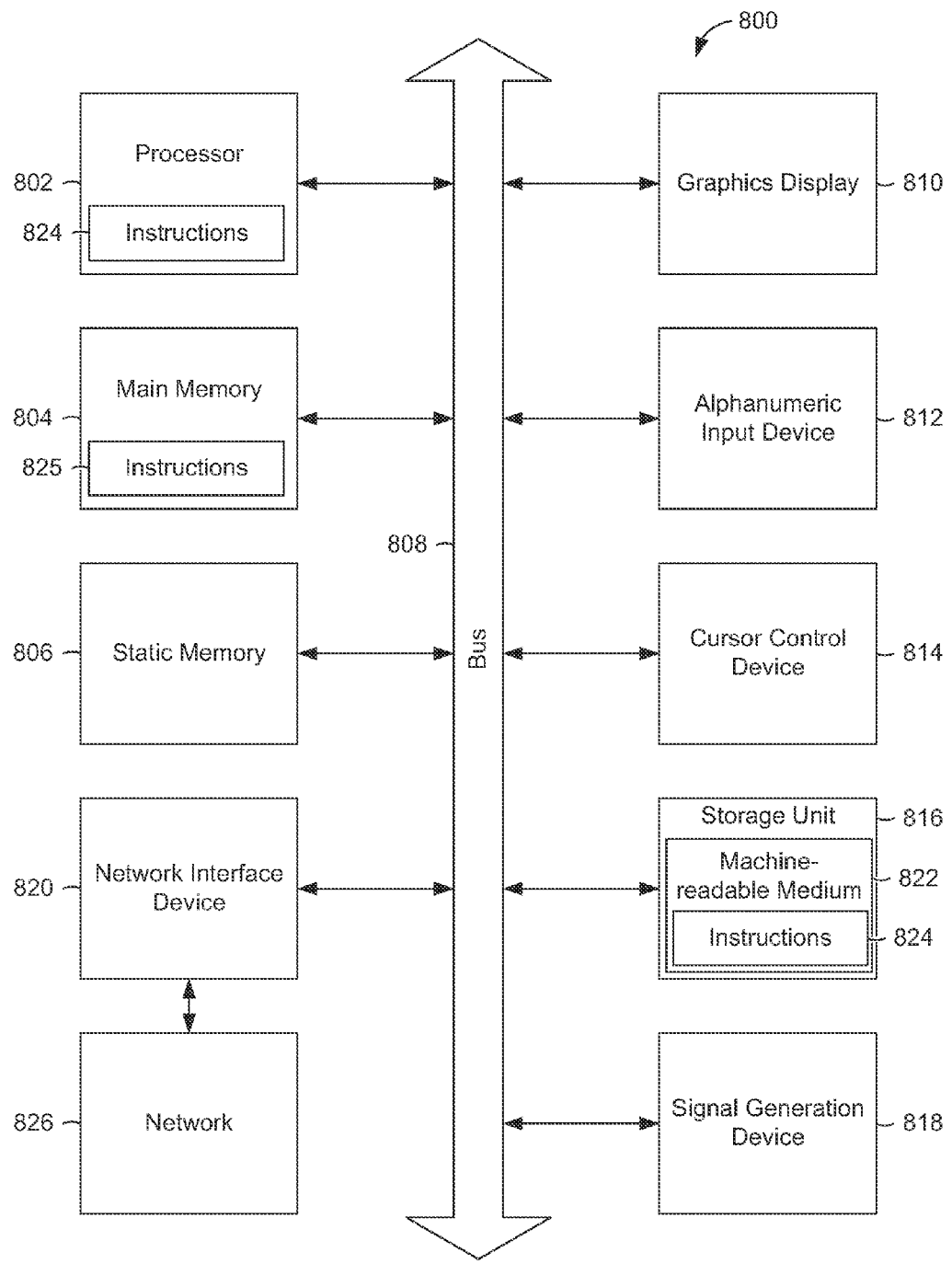
FIG. 8 is a block diagram illustrating components of a machine, according to some example implementations, able to read instructions from a machine-readable medium and perform any one or more of the methodologies discussed herein.

FIG. 8 illustrates components of a machine 800, according to some example implementations, that is able to read instructions from a machine-readable medium (e.g., a machine-readable storage medium) and perform any one or more of the methodologies discussed herein. Specifically, FIG. 8 shows a diagrammatic representation of the machine 800 in the example form of a computer system and within which instructions 824 (e.g., software) for causing the machine 800 to perform any one or more of the methodologies discussed herein may be executed. In alternative implementations, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824 (sequentially or otherwise) that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The machine 800 may further include a graphics display 810 (e.g., a plasma display panel (PDP), a liquid crystal display (LCD), a projector, or a cathode ray tube (CRT)). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a speaker), and a network interface device 820.

The storage unit 816 includes a machine-readable medium 822 on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, during execution thereof by the machine 800. Accordingly, the main memory 804 and the processor

802 may be considered as machine-readable media. The instructions 824 may be transmitted or received over a network 826 (e.g., network 390) via the network interface device 820.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example implementation to be a single medium, the term "machine-readable medium" should be taken to include a single medium or multiple media (e.g., a centralized or distributed database, or associated caches and servers) able to store instructions (e.g., instructions 824). The term "machine-readable medium" shall also be taken to include any medium that is capable of storing instructions (e.g., software) for execution by the machine, such that the instructions, when executed by one or more processors of the machine (e.g., processor 802), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain implementations are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example implementations, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some implementations, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In implementations in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example implementations, the one or more processors or processor-implemented modules may be located in a single geographic location (e.g., within a home environment, an office environment, or a server farm). In other example implementations, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used in the data processing arts. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer-implemented method executed using one or more processors, the method comprising:
    receiving, by the one or more processors and from a user, exploration configuration data usable to configure an exploration of at least a portion of a social network of the user, the social network representing a plurality of relationships among a plurality of entities associated with the user by one or more social network services, the exploration configuration data including one or more profile parameters, a profile parameter comprising an attribute and a value of the attribute which are descriptive of at least some of the plurality of entities, the exploration configuration data further including one or more path parameters, a path parameter influencing a path between entities through the social network that is taken in exploring the social network to confine the exploration within the social network;
    performing, by the one or more processors, the exploration of at least the portion of the social network, the exploration being configured by the one or more path parameters to follow the path between entities and including a retrieval of profile data that is descriptive of at least some of the plurality of entities, the retrieval being based on at least one profile parameter of the one or more profile parameters;
    identifying, by the one or more processors, one or more entities among the plurality of entities as being described by the at least one profile parameter, the identifying being based on the exploration as configured by the exploration configuration data; and
    providing, by the one or more processors, information associated with the one or more entities for display to the user.

2. The method of claim 1, further comprising:
    performing an action on behalf of the user with respect to at least one entity of the one or more entities identified as being described by the profile parameter.

3. The method of claim 2, wherein the action includes at least one of:
    submitting a public contribution to a webpage of the at least one entity,
    sending a private message to the at least one entity via a social network service of the one or more social network services,
    indicating that the user endorses an interaction published by the at least one entity,
    submitting a comment on the interaction published by the at least one entity,
    submitting a descriptor for the interaction published by the at least one entity,
    requesting removal of the descriptor for the interaction published by the at least one entity,
    accessing a public portion of a profile of the at least one entity,
    accessing a restricted portion of the profile of the at least one entity,
    accessing a private portion of the profile of the at least one entity, and
    accessing a further profile for a further entity that is referenced by the profile of the at least one entity.

4. The method of claim 2, wherein the action includes at least one of:
    identifying media associated with the at least one entity to the user, and
    communicating an alert to the user regarding the at least one entity.

5. The method of claim 2, wherein:
    performing the action includes at least one of:
        protecting an identity of the user from the at least one entity, and
        protecting an identity of the at least one entity from the user.

6. The method of claim 2, further comprising:
    receiving an authorization from the at least one entity to perform the action, wherein the action is performed in response to receiving the authorization.

7. The method of claim 6, further comprising:
    communicating a request to the at least one entity for the authorization to perform the action, wherein receiving the authorization is in response to communicating the request.

8. The method of claim 7, further comprising:
    accessing preference data of the at least one entity from the social network service, wherein communicating the request for the authorization is based on the preference data of the at least one entity.

9. The method of claim 1, wherein:
    the path parameter specifies a threshold social quality of a relationship between the user and the at least one entity identified as being described by the profile parameter; and performing of the exploration is based on the threshold social quality.

10. The method of claim 9, further comprising:
determining a further social quality based on a count of entities between the user and the at least one entity within the social network, wherein performing the exploration is based on a comparison of the further social quality to the threshold social quality.

11. The method of claim 9, wherein:
the threshold social quality is expressed as a count of entities in the social network between the user and the at least one entity, the count of entities being at least one of a maximum count or a minimum count.

12. The method of claim 9, further comprising:
determining the social quality based on a degree of strength of a relationship as indicated by the one or more social network services, the relationship being between at least two of:
the user,
the entity, and
a further entity in the at least some of the plurality of entities.

13. The method of claim 12, wherein:
the threshold social quality is at least one of a maximum degree of strength or a minimum degree of strength.

14. The method of claim 12, wherein:
determining the social quality is based on a sum of multiple degrees of strength for multiple relationships as indicated by the one or more social network services among at least some of the plurality of entities.

15. The method of claim 13, wherein:
determining the social quality is based on an average of multiple degrees of strength for multiple relationships as indicated by the one or more social network services among at least some of the plurality of entities.

16. The method of claim 9, further comprising:
determining the social quality based on a degree of influence held over the at least one entity by a further entity in the at least some of the plurality of entities as indicated by the one or more social network services.

17. The method of claim 1, wherein:
the path parameter is a constraint provided by the user; and
performing the exploration is limited to the portion of the social network.

18. The method of claim 1, wherein:
the path parameter is a preference of the user; and
performing the exploration is not limited to the portion of the social network.

19. A non-transitory machine-readable storage medium comprising instructions that, when executed by one or more processors of a machine, cause the machine to perform operations comprising:
receiving, from a user, exploration configuration data usable to configure an exploration of at least a portion of a social network of the user, the social network representing a plurality of relationships among a plurality of entities associated with the user by one or more social network services, the exploration configuration data including one or more profile parameters, a profile parameter comprising an attribute and a value of the attribute which are descriptive of at least some of the plurality of entities, the exploration configuration data further including one or more path parameters, a path parameter influencing a path between entities through the social network that is taken in exploring the social network to confine the exploration within the social network;
performing the exploration of at least the portion of the social network, the exploration being configured by the one or more path parameters to follow the path between entities and including a retrieval of profile data that is descriptive of at least some of the plurality of entities, the retrieval being based on at least one profile parameter of the one or more profile parameters;
identifying one or more entities among the plurality of entities as being described by the at least one profile parameter, the identifying being based on the exploration as configured by the exploration configuration data; and
providing information associated with the one or more entities for display to the user.

20. A system, comprising:
one or more processors; and
a machine-readable storage medium comprising instructions that, when executed by the one or more processors, cause the one or more processors to perform operations comprising:
receiving, from a user, exploration configuration data usable to configure an exploration of at least a portion of a social network of the user, the social network representing a plurality of relationships among a plurality of entities associated with the user by one or more social network services, the exploration configuration data including a profile parameter comprising an attribute and a value of the attribute which are descriptive of at least some of the plurality of entities, the exploration configuration data further including one or more path parameters, a path parameter influencing a path between entities through the social network that is taken in exploring the social network to confine the exploration within the social network;
performing the exploration of at least the portion of the social network, the exploration being configured by the path parameter to follow the path between entities and including a retrieval of profile data that is descriptive of at least some of the plurality of entities, the retrieval being based on at least one profile parameter of the one or more profile parameters;
identifying one or more entities among the plurality of entities as being described by the at least one profile parameter, the identifying being based on the exploration as configured by the exploration configuration data; and
providing information associated with the one or more entities for display to the user.

* * * * *